Aug. 15, 1950     R. M. ROWELL     2,519,071
HOOK-ON POWER-FACTOR INDICATOR
Filed June 17, 1948     2 Sheets-Sheet 1
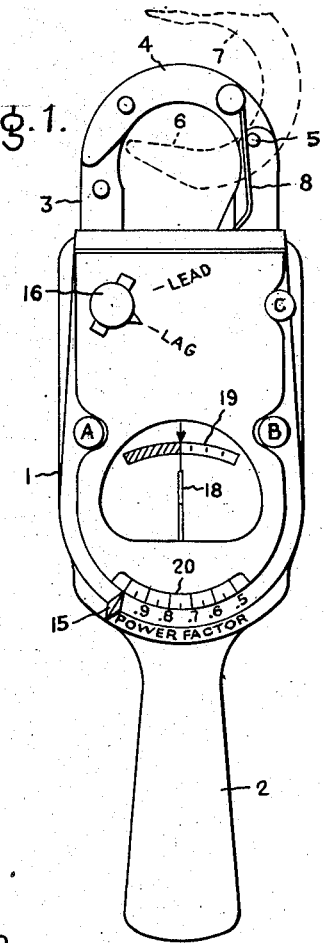
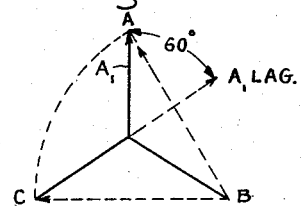
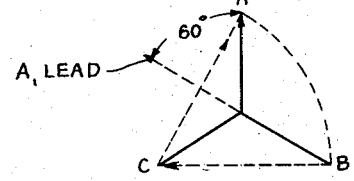
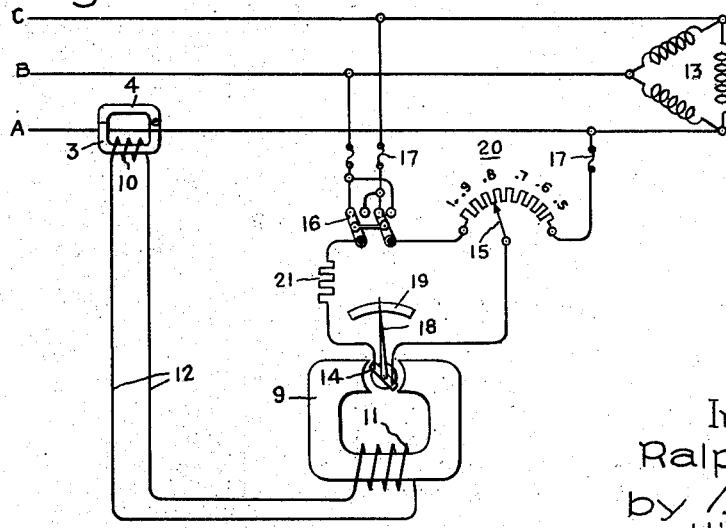
Inventor:
Ralph M. Rowell,
by Prowell S. Mack
His Attorney.

Aug. 15, 1950 — R. M. ROWELL — 2,519,071
HOOK-ON POWER-FACTOR INDICATOR
Filed June 17, 1948 — 2 Sheets-Sheet 2
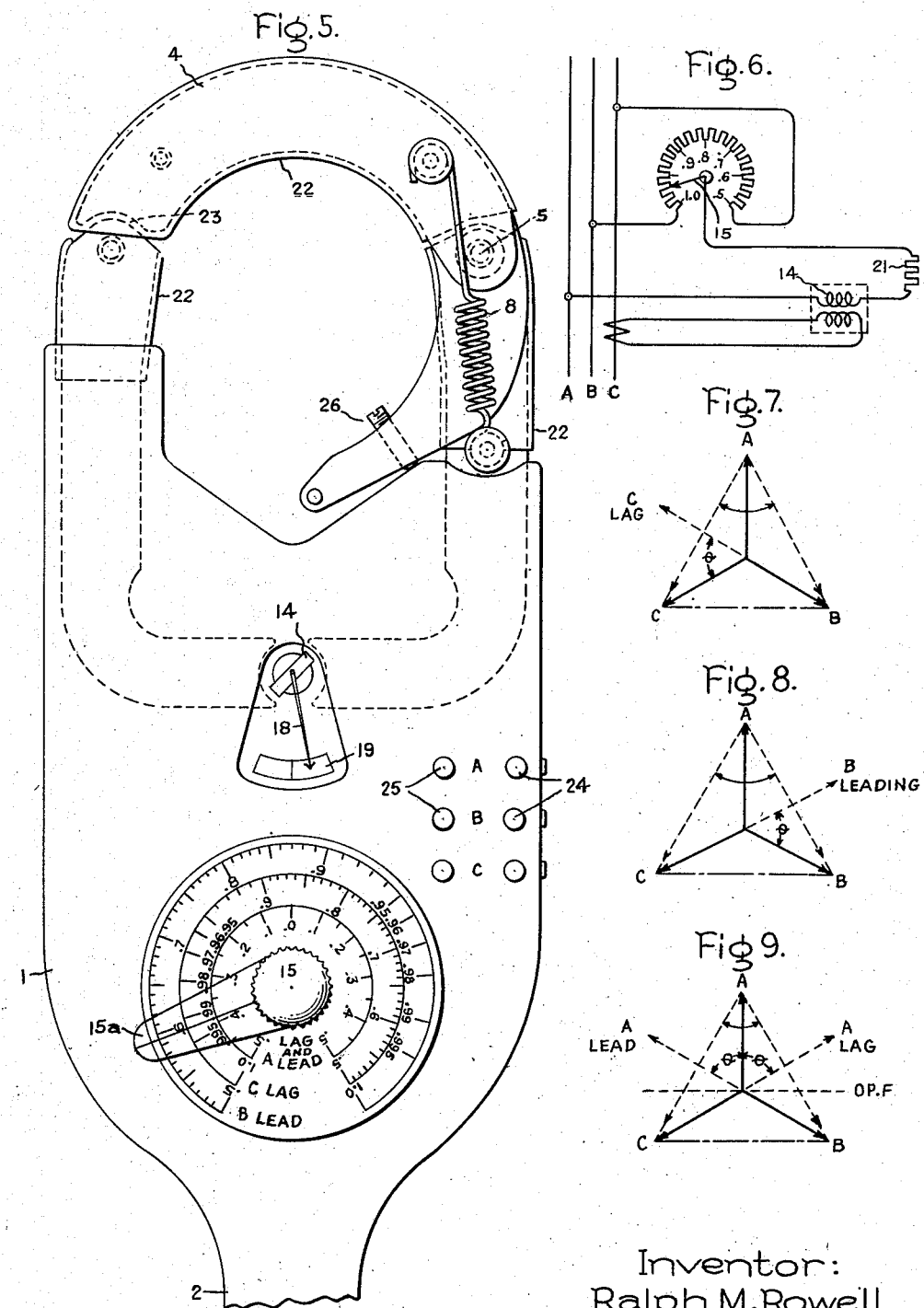
Inventor:
Ralph M. Rowell,
by Pawell S. Mack
His Attorney.

Patented Aug. 15, 1950

2,519,071

UNITED STATES PATENT OFFICE 2,519,071

HOOK-ON POWER-FACTOR INDICATOR

Ralph M. Rowell, Lynn, Mass., assignor to General Electric Company, a corporation of New York Application June 17, 1948, Serial No. 33,562

5 Claims. (Cl. 172—245)

My invention relates to power-factor measuring apparatus that may be connected to and disconnected from a power circuit to be metered without opening the circuit. It may be used to measure either leading or lagging power factor of a three-phase circuit. In carrying my invention into effect, I employ an alternating current wattmeter having a zero-center scale adapted to be energized in response to the current of the circuit being metered by a hook-on type of magnetic circuit, and with its voltage winding selectively energized through a potentiometer resistor connected across two wires of the three-phase circuit, and capable of shifting the phase angle between current and voltage to produce a quadrature relation and a null reading on the wattmeter. The potentiometer is provided with one or more scales calibrated directly in terms of power factor. The entire apparatus is built as a self-contained unit.

The features of my invention which are believed to be novel and patentable will be pointed out in the claims appended hereto. For better understanding of my invention, reference is made in the following description to the accompanying drawings in which Fig. 1 represents a limited measurement range embodiment of my invention which employs a reversing switch in the potential circuit. Figure 2 shows the circuit arrangement for the apparatus of Fig. 1, and Figs. 3 and 4 are vector diagrams explanatory of the manner of operation of the apparatus of Fig. 1. Figure 5 represents the essential features of a wide range power-factor meter embodying my invention; Fig. 6 the wiring diagram therefor; and Figs. 7, 8, and 9 vector diagrams explanatory of the operation of the apparatus of Fig. 5.

Referring now to Figs. 1 and 2, the apparatus is housed in an easily portable casing 1 of suitable insulating material having a handle 2. The casing contains a magnetic circuit 3 which extends through the upper wall and is provided with an external hook 4 hinged at 5 so as to be hooked over and to magnetically enclose a current cable of the circuit to be metered. The hook is so formed that when open, as indicated in dotted lines, it may be closed by placing the part 6 against the cable and pressing upward with the handle, and can be opened by resting the part 7 against the cable and pulling down with the handle. Thus the operator does not need to contact the cable and may perform the hook-on and off operations with one hand. A toggle spring 8 is provided to hold the hook in either of its closed or open positions. Within the casing is a wattmeter 9, see Fig. 2. Preferably, the magnetic circuit of the wattmeter and the hook-on magnetic circuit 3 are common, as indicated in Fig. 5, but in the wiring diagram of Fig. 2 they are shown separate, and connected in energizing relation by a secondary coil 10 on the hook-on current transformer 3—4 and a current coil 11 on the magnetic circuit of the wattmeter and the connecting wires 12.

In Fig. 2 the wires A, B, and C represent a three-phase source of alternating current supply and 13 a load connected thereto. My apparatus is shown as connected to measure the power factor of the three-phase circuit. The moving voltage coil 14 of the wattmeter is connected from one wire B of the three-phase circuit to the adjustable tap 15 of a resistance potentiometer which is connected across the other two wires A and C of the three-phase circuit. There is a reversing switch 16 between the voltage connections to lines B and C, and the meter and potentiometer connections of all voltage circuits preferably contain fuses indicated at 17. The resistance at 21 is merely a current reducing resistance and will have a value which may vary for different voltage circuits. The fuses, potentiometer and reversing switch are housed in the casing 1 of Fig. 1, and the operating handles for the potentiometer and switch are indicated by corresponding reference characters in Figs. 1 and 2. The terminals marked A, B, and C in Fig. 1 indicate the voltage connecting terminals to the three phases A, B, C, Fig. 2. The wattmeter has a pointer 18 indicating on a scale 19 of the zero-center type such that the pointer is at the center of the scale when the wattmeter is not energized, or is energized under zero power-factor conditions. The potentiometer is provided with a calibrated power-factor scale 20 on which the adjusted tap 15 indicates as a pointer. In Fig. 1 this scale is graduated from .5 to 1. power factor and may be leading or lagging, depending upon the position of the reversing switch 16 when the wattmeter reads zero.

The procedure for measuring power factor is to establish the connections represented in Fig. 2 and adjust the potentiometer until the wattmeter reads zero. If a zero deflection cannot be obtained with such connection, the reversing switch 16 is turned to the other position and the potentiometer adjusted until a null or zero wattmeter reading is obtained. The position of adjustable tap 15 on scale 20 will then indicate the power factor, and the position of switch 16 will indicate whether the power factor is leading or lagging. The apparatus of Figs. 1 and 2 is not intended to measure power factors below .5 but will indicate that the power factor is below this value by failure to obtain a zero wattmeter indication. The theory of such measurements is explained with the aid of the vector diagrams of Figs. 3 and 4. Figure 3 represents the vector diagram for the connections represented in Fig. 2. The vector $A_1$ is assumed to represent the current in line A; A—B the voltage between lines A and B; B—C the voltage between lines B and C, etc. at unity power factor.

With the potentiometer tap 15 set at unity power factor, the voltage applied to the voltage coil of the wattmeter will be that across lines B—C, and the wattmeter will read zero since the current and voltage are 90 degrees out of phase as represented in Fig. 3. Now let us assume that the current A lags because of an inductive load. If the potentiometer tap 15 is still set at unity power factor, the phase angle between current and voltage in the wattmeter would change and the wattmeter would deflect. By moving the tap 15 to the right, the vector B—C, Fig. 3, is rotated clockwise until the 90-degree relation is again established and the wattmeter reads zero. If the current A lags by 60 degrees, also represented in Fig. 3 by "$A_1$ lag" corresponding to .5 power factor, it will be necessary to move the potentiometer tap 15 to the extreme right of its resistance to obtain zero wattmeter deflection. This would connect the voltage coil of the wattmeter across lines A and B and establish the 90-degree relation represented between $A_1$ lag and vector A—B. The potentiometer may thus be calibrated in power factor and will indicate power factor when adjusted to cause a null or zero wattmeter reading. In case the power factor becomes leading, this will be indicated by an increase in wattmeter reading when the potentiometer is shifted from unity toward .5 on its scale, and it is then necessary to operate the reversing switch 16 to the indication "Lead." In this connection the wattmeter potential coil is connected across phase B—C when the potentiometer is at the unity power-factor position, and across A—C when at the .5 power-factor position. Figure 4, "$A_1$ lead" indicates a 60-degree leading power-factor condition for the current $A_1$, 90 degrees in phase from voltage vector A—C. The wattmeter will thus read zero when the potentiometer is adjusted to the .5 power-factor position and will read zero for higher leading power-factor conditions with corresponding intermediate adjustments of the potentiometer between 1. and .5. Thus the single power-factor scale and potentiometer, together with the reversing switch 16, enable the accurate measurement of all power factors not less than .5 leading or lagging. It is assumed that the three-phase circuit is balanced. However, for unbalanced power-factor, current, or voltage conditions, the current transformer may be hooked over different line phases and the voltage connections shifted accordingly to investigate and measure unbalanced power-factor conditions. In any connection the correct position of the reversing switch 16 can be determined by setting the potentiometer for unity power factor. If the wattmeter reads to the left or shaded portion of the scale 19, Fig. 1, the switch should be reversed. The potentiometer can then be adjusted to obtain the correct power factor, and the position of the reversing switch will indicate whether it is leading or lagging.

In the embodiment of the invention of Fig. 5, provision is made for the measurement of power factor over the complete measurement range including zero power factor. A reversing switch is not used but the different power-factor ranges are obtained by hooking the current energizing circuit over different current phases. Also some of the structural details differ from the apparatus of Fig. 1. The exposed portions of the hook-on magnetic circuit are preferably covered by insulating material 22. To assure that the closed reluctance of the hook-on magnetic circuit will always be the same for a given calibration and to afford some adjustment of the calibration, the air gap 23 at the opening of the hook-on jaws is made adjustable and definite by an adjustable stop screw 26 in the tail of the hinged hook and which rests against the fixed part of frame 1 when the jaws are substantially closed. The moving coil 14 of the wattmeter element is contained in an air gap which is directly in the hook-on magnetic circuit, and no secondary current transformer winding or stationary wattmeter current coil is required. The hook-on magnetic circuit serves the multiple purpose of a hook-on current transformer and wattmeter magnetic circuit, or the primary cable over which it is hooked may be considered as the current coil of the wattmeter.

The single potentiometer is provided with three power-factor scales marked A, B and C, only scale C being indicated in Fig. 6. The position of the potentiometer is adjusted by a hande 15 which carries a transparent indexing member 15a and by means of which the selected power-factor scale is read. The voltage connecting terminals are represented at 24, and renewable fuses for each voltage circuit at 25. The voltage terminals are marked A, B, and C to coordinate them with the power-factor scales employed. The circuit connections for use of scale C and the vector diagram of Fig. 7 are represented in Fig. 6, where it is noted that the current is coupled to current phase C, and the potentiometer resistance is connected across phases B and C and the moving coil 14 of the wattmeter between the potentiometer and voltage phase A. In Fig. 6 the stationary current coil 14 of the wattmeter is represented in a conventional way as supplied from a current transformer but it is to be understood that the actual arrangement is as described and illustrated in connection with Fig. 5. For the connection of Fig. 6 the "lag C" scale of the potentiometer is used. Figure 7 represents the condition for 60 degrees lagging current and a zero reading of the wattmeter when the potentiometer is adjusted to the .5 power-factor end of its resistance. Other lagging power factors between this and unity are measurable by adjusting the potentiometer towards the other end of the scale. This causes the voltage vector used to shift from AC to AB. The power-factor graduations of the potentiometer of Fig. 6 represent this C scale.

To measure leading power factor from .5 to unity, the current circuit of the wattmeter is energized from phase B with the voltage connections remaining the same. Figure 8 represents this connection with the phase B current leading by 60 degrees and the power factor is read on the B scale. Note that power-factor graduations on the B scale are in reverse to that of the C scale, and that for a .5 power-factor leading measurement the potentiometer will be adjusted to the left end of the resistance and the wattmeter voltage circuit energized from across phases A and B.

For power-factor measurements below .5 the current circuit is energized by shifting the hook-on magnetic circuit to embrace phase A and power factor is read on scale A. When the current is between 90 degrees and 60 degrees lagging, the current A vector will shift between the horizontal line marked "O P. F." in Fig. 9 pointing to the right and the vector marked "A Lag," and the wattmeter will read zero for the 60-degree lag .5 power-factor condition when the potentiometer is at the left end of the scale, and will read zero for a zero power factor when the potentiometer is at the midpoint of its resistance and scale; and the wattmeter will read zero for a .5 leading power factor when the potentiometer is at the right end of its resistance and scale.

In shifting the hook-on current energizing magnetic circuit from one phase lead to the other, care should be taken not to reverse the direction of current flow to the load therethrough; otherwise the measurements will become confused. Suitable instructions for the connections and use of the apparatus will accompany each device which, if followed, will prevent confusion of the measurements.

It is seen that I have provided portable self-contained three-phase power-factor measuring apparatus that can be quickly connected to a power circuit without opening the line. The apparatus is reasonably safe and easy to use. The null type of indicator and calibrated air gap in the magnetic circuit assure good measurement accuracy.

While the wattmeters referred to in the apparatus described are not primarily intended for measuring watts, they may be used for measuring single-phase watts and will come in handy at times for approximately indicating the watts flowing in different phases of the three-phase circuit and the direction thereof, and to obtain total wattage by addition. Thus, in Fig. 2, with the tap 15 adjusted to the right end of the potentiometer resistance, the meter will indicate the watts flowing in the phase portion AB of the circuit. Then by hooking the magnetic circuit 3—4 over conductor C and moving the tap 15 to the left of its resistance, the power in phase portion CB will be indicated. The scale of the wattmeter may be calibrated for such measurements as indicated in Fig. 1.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A hook-on type of power-factor meter for three-phase circuits comprising a portable casing having a handle at one end, a magnetic circuit within said casing and extending from the other end of said casing and including an external hinged section for coupling the magnetic circuit with one of the conductors of the circuit to be metered, a single-phase indicating type alternating current wattmeter in said casing adapted to have its field energized in response to the current flow in such conductor through said magnetic circuit, a resistance within said casing adapted to be connected across two of the conductors of the three-phase circuit to be metered, a tap adjustable along said resistance and connections for energizing the voltage circuit of said wattmeter from the remaining conductor of the three-phase circuit to be metered and said adjustable potentiometer tap, a scale on said casing and an indicator movable with said adjustable tap for indicating on said scale, said scale being graduated in power-factor designations such that when the potentiometer is adjusted to cause the energized wattmeter to read zero the power factor of said circuit is indicated on said scale.

2. A hook-on type of three-phase power-factor measuring apparatus comprising a portable casing, a magnetic circuit within said casing and extending from one end of said casing and including an external hinged hook portion whereby the magnetic circuit may be coupled with one of the conductors of the circuit to be metered, a single-phase indicating type alternating current wattmeter in said casing adapted to have its field energized through said magnetic circuit in response to current flow in the conductor coupled therewith, a resistance within said casing adapted to be connected across two of the lines of such three-phase circuit, a tap adjustable along said resistance, connections for energizing the voltage circuit of said wattmeter from the remaining line of such circuit and said adjustable tap, a two-position switch on said casing for selectively interchanging one of the line connections of said resistance and the line connection of the voltage circuit of said wattmeter, a scale on said casing and an indicator therefor moved over said scale by the adjustment of said tap, said scale being graduated in power-factor designations from .5 to 1. such that when the tap is adjusted to cause the energized wattmeter to read zero with said switch in one position the indicator indicates the leading power factor, and when adjusted to cause the energized wattmeter to read zero with said switch in the other position the indicator indicates the lagging power factor of such three-phase circuit.

3. A hook-on type of power-factor measuring apparatus for three-phase circuits comprising a portable casing, a magnetic circuit within said casing and extending from one end thereof and provided with an external hinged section to enable the magnetic circuit to be selectively coupled with any one of the conductors of the circuit to be metered, an indicating type of single-phase wattmeter within said casing having its field energized in response to current flow in the conductor with which said magnetic circuit is coupled, a resistance within said casing adapted to be energized in response to the voltage across two of the lines of such circuit, a tap adjustable along said resistance, connections for energizing the voltage circuit of said wattmeter in response to the voltage between said adjustable tap and the remaining line of such circuit, three scales on said casing, an indicator moved with said adjustable tap and indicating on said scales, said three scales being graduated to respectively indicate the power factor of said circuit when the tap is adjusted to cause the energized wattmeter to read zero and said magnetic circuit is separately coupled with the three conductors of said circuit respectively.

4. Apparatus for the measurement of power factor on three-phase circuits comprising a portable casing having a handle at one end, a magnetic circuit partially within and extending out of the other end of said casing, said magnetic circuit having a hinged external section whereby it may be coupled with a conductor of the circuit to be metered and having a graduated stop for calibrating the air gap reluctance of the magnetic circuit when the hinged section is in the closed coupling position, an air gap in said magnetic circuit within said casing, a single moving coil in said last-mentioned air gap, said moving coil and magnetic circuit when coupled with such conductor constituting an alternating current wattmeter of the indicating type, a resistance potentiometer within said casing having an adjustable tap, a power-factor scale on said casing, an indicator moved in response to such potentiometer adjustment for indicating on said scale, terminals on said casing for making voltage connections to the circuit to be metered and connections between said terminals and said moving coil and said resistance and between the adjustable tap of said potentiometer and moving coil for energizing said moving coil through said potentiometer from such circuit, the adjustment of said potentiometer causing a phase shift in the voltage energization of said wattmeter, and said scale and indicator being graduated to indicate the power factor of such circuit when the energized wattmeter indicates zero.

5. A hook-on type of power-factor measuring apparatus comprising a portable casing, a magnetic circuit within said casing and extending from one end of said casing and including an external hinged hook portion whereby said magnetic circuit may be coupled with one of the conductors of the circuit to be metered, an indicating type alternating current wattmeter in said casing adapted to have its field energized through said magnetic circuit in response to current flow in the conductor coupled therewith, a phase shifting network within said casing including an adjustable tap resistance, a pointer moved with the adjustable tap of said resistance, a power-factor scale on said casing on which said pointer indicates, connections for energizing the voltage circuit of said wattmeter from the voltage of the line to be metered through said adjustable resistance, and a two-position switch on said casing for selectively interchanging certain of said voltage connections, the phase relation of the voltage applied to the voltage circuit of said wattmeter relative to the current in the conductor coupled with the wattmeter field being shifted both by adjustment of said resistance and the operation of said switch such that when the switch is in one of its selected positions the position of said pointer on the power-factor scale indicates the leading power factor of the circuit when the wattmeter indicates zero and when the switch is in the other of its selected positions the position of said pointer on the power-factor scale indicates the lagging power factor of the circuit when the wattmeter indicates zero.

RALPH M. ROWELL.

REFERENCES CITED

The following references are of record in the file of this patent:

UNITED STATES PATENTS

| Number | Name | Date |
|---|---|---|
| 2,146,555 | Arey | Feb. 7, 1939 |

FOREIGN PATENTS

| Number | Country | Date |
|---|---|---|
| 393,589 | Great Britain | June 6, 1933 |